July 20, 1954

F. BIELING 2,684,430

ELECTRIC COOKING APPLIANCE WITH
COOKING PLATE AND THERMOSTAT
Filed April 27, 1951

INVENTOR:
FRITZ BIELING

By C. M. Avery
ATTY

Patented July 20, 1954

2,684,430

UNITED STATES PATENT OFFICE 2,684,430

ELECTRIC COOKING APPLIANCE WITH COOKING PLATE AND THERMOSTAT

Fritz Bieling, Traunstein, Germany, assignor to Siemens - Schuckertwerke Aktiengesellschaft, Berlin-Siemensstadt, Germany Application April 27, 1951, Serial No. 223,242

Claims priority, application Germany June 5, 1950

5 Claims. (Cl. 219—37)

My invention relates to electric cooking apparatus which have a hot plate equipped with a thermostat for automatic temperature regulation.

In the known apparatus of this kind, the thermostat, usually consisting of a bimetal switch, is arranged and mounted for good heat conduction from the hot plate and, for that reason, cannot be readily removed or replaced.

It is therefore an object of my invention to provide an electrically heated hot-plate apparatus that not only secures a good and direct heat transfer from the plate to the thermostat but also affords readily removing the heat regulation for checking or replacement.

According to the invention the thermostatic heat regulator is a replaceable unit and is mounted in the central part of the cooking plate in good thermal contact with the active surface portion of the plate.

To have the thermostat respond as quickly as possible, it is of advantage, according to another feature of the invention, to place the heat regulator in additional thermal contact with parts of the heating elements, especially with a heat-conducting fin of the plate structure.

According to a further feature of the invention, an auxiliary heater winding for the regulator thermostat is series connected with the heater of the hot plate.

According to still another feature of the invention, the thermostat is built into a housing of a material of good thermal conductivity, such as brass. The housing is preferably circular in cross section and engages the hot-plate structure at a housing portion adapted to the shape of the cooking plate. The heat sensitive member of the thermostat is mounted in the housing or may be part thereof.

Figure 1:
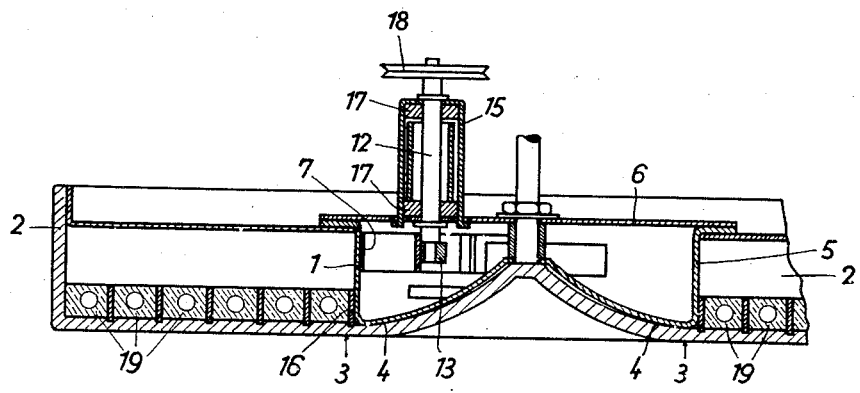
Figure 2:
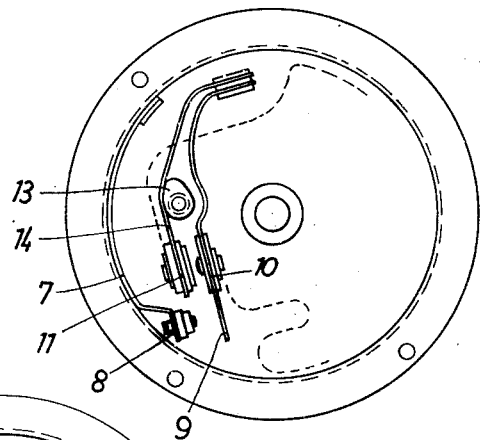

The invention is best understood in conjunction with the example shown in the accompanying drawings. Fig. 1 shows a cross section of the cooking apparatus, Fig. 2 is a top view of the pertaining regulator with its cover removed, and Fig. 3 is a similar top view of a somewhat modified regulator.

The apparatus has a substantially cup-shaped hot-plate structure 2. The bottom portion of this structure (normally used so that it forms the top) forms the cooking surface for supporting a cooking utensil. The plate structure has heat-conducting annular fins 16 at the inside of the bottom portion. A heating resistor 19, for heating the active surface 3 of the cooking plate, is mounted between the heat-conducting fins. The heating resistor occupies an annular space and leaves the central part of the cooking plate free. Disposed in the central space is a heat regulator. The regulator has a housing or box 1, for example, of sheet brass. The casing is in good thermal contact with the active surface portion 3 of the cooking plate. The contact is most intimate at an annular contact area 4 where the housing 1 is in face-to-face engagement with an inwardly projecting center portion of the plate structure. The side walls 5 of housing 1 are also in good thermal contact with parts of the heating elements. The illustrated contact of the housing with a heat conducting fin 16 is especially suitable for this purpose. The housing 1 is closed by a cover 6. The heat sensitive member 7 of the thermostat, which consists of a bimetal strip, is mounted on the inner surface of the side wall 5 of the housing in good thermal contact therewith. The bimetal strip 7 acts with its end 8 on a contact spring 9, which bears a regulator contact 10. This regulator contact 10 coacts with another regulator contact 11 mounted on a contact spring 14. The contact springs 9 and 14 are made preferably of a heat resisting material such as a berylliferous alloy. When the bimetal strip 7 is sufficiently heated, its end 8 deflects toward spring 9 and moves the contact 10 away from the contact 11, thus opening the circuit of the heating resistor 19.

For adjusting the response temperature of the thermostat, the cover 6 carries the rotatable shaft 12 of an adjusting device. A cam 13 at the lower end of shaft 12 permits changing the position of the contact spring 14. The upper end of shaft 12 carries a sheave 18 which transmits the rotary motion required for adjusting the response temperature. A sleeve structure 15 carries the bearings 17 for the adjusting shaft 12.

Figure 3:
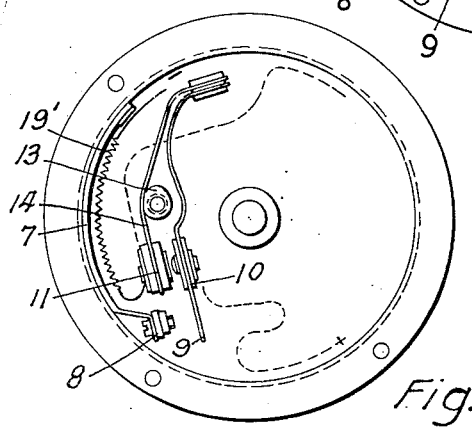

The modified design of the regulator shown in Fig. 3 is additionally equipped with an auxiliary heating winding 19' for additionally heating the heat-responsive bimetal member. The auxiliary winding 19' is series connected with the heating resistor 19 to be traversed by the controlled heating current. As can be seen from the drawing, the regulator is a separate unit which can be inserted and removed without difficulty.

I claim:

1. An electric cooking apparatus, comprising a substantially shell-shaped hot-plate structure having a cooking surface, a heating resistor joined with said structure and occupying an annular space at the rear of said surface so as to leave a center space free, a temperature regulator responsive to the temperature of said structure and having a closed heat-conductive housing of flat shape and a thermostat switch within said housing, said housing being exchangeably mounted in said center space with said thermostat located entirely in the interior of said shell-shaped structure, said housing having a front face in an immediate heat-conductive face-to-face contact with said structure at the rear of said surface.

2. An electric cooking apparatus, comprising a substantially cup-shaped plate structure having an exterior cooking surface at the bottom and having at said surface an inwardly projecting center portion, a heating resistor joined with said structure and occupying an annular space around said center portion within the cup space of said structure and at the rear of said surface, a temperature regulator responsive to the temperature of said structure, said regulator having a flat and closed housing of good heat-conductive material and having a thermostat switch disposed in said housing and heat-conductively joined therewith, said housing being disposed substantially entirely within the cup space of said structure and within the center space of said heating resistor so that said regulator is located entirely in the space within said cup-shaped structure, said housing having an annular front surface in immediate face-to-face contact with said inwardly projecting center portion, and a pressure bolt centrally secured to said structure at the rear of said cooking surface, said regulator housing being exchangeably seated on said bolt and being held pressed by said bolt against said structure.

3. An electric cooking apparatus, comprising a substantially cup-shaped hot-plate structure having an exterior cooking surface and having a heat-conductive annular fin located at the rear of said cooking surface and forming a circular center space and an annular space around said center space, a heating resistor joined with said structure and disposed in said annular space, a temperature regulator responsive to the temperature of said structure, said regulator having a heat-conductive closed housing of flat shape and having a thermostat switch disposed in said housing and heat-conductively joined therewith, said housing being exchangeably mounted in said center space and substantially within the cup space of said structure, and said housing having a large front face in heat-conductive contact with said structure at the rear of said cooking surface along an annular area adjacent to said fin.

4. An electric cooking apparatus, comprising a substantially cup-shaped plate structure having an exterior cooking surface at its bottom, electric heater means joined with said structure and occupying an annular space behind said cooking surface so as to leave a center space free, a temperature regulator responsive to the temperature of said structure, said regulator having a circular and flat housing of good heat-conductive material and having a thermostat switch disposed in said housing and enclosed therein, said housing being removably mounted in said center space so that said switch is located entirely within the cup space defined by said structure, said housing having a large front surface in heat-conductive contact with the bottom of said structure, and said thermostat switch having a temperature-responsive member mounted on the inner wall surface of said housing.

5. An electric cooking apparatus, comprising a substantially cup-shaped plate structure having an exterior cooking surface at its bottom, electric heater means concentrically joined with said structure and occupying an annular space behind said cooking surface so as to leave a center space free, a temperature regulator responsive to the temperature of said structure and having a flat and closed heat-conductive housing exchangeably mounted in said center space in heat-conductive contact with the bottom of said structure, said regulator having contact means and heat-responsive thermostat means mounted in said housing and located within the cup space defined by said structure, said thermostat means being heat-conductively joined with said housing and engageable with said contact mans for controlling said contact means, and an auxiliary heating element disposed in said housing in heating relation to said thermostat means, said heater means and said heating element being electrically interconnected to be traversed by the heating current of the apparatus.

References Cited in the file of this patent

UNITED STATES PATENTS

| Number | Name | Date |
|---|---|---|
| 2,140,479 | Meyers et al. | Dec. 13, 1938 |
| 2,148,407 | Pierson | Feb. 21, 1939 |
| 2,306,979 | Potsdam | Dec. 29, 1942 |
| 2,311,087 | Sandell | Feb. 16, 1943 |
| 2,329,116 | Heilman | Sept. 7, 1943 |
| 2,534,097 | Akeley | Dec. 12, 1950 |